United States Patent Office 3,500,239
Patented Mar. 10, 1970

3,500,239
HEAD FOR GASEOUS FLUX MOLECULAR LASER
Charles Frappard, Verrieres-le-Buisson, Maurice Roulot, Orsay, and Albert Brule, Issy-les Moulineaux, France, assignors to Compagnie Generale d'Electricite, Paris, France, a corporation of France
Filed Aug. 17, 1967, Ser. No. 661,296
Claims priority, application France, Aug. 19, 1966, 73,626
Int. Cl. H01s 3/22
U.S. Cl. 331—94.5                                        10 Claims

ABSTRACT OF THE DISCLOSURE

A head for a gas laser including a thick plate supporting an annular electrode, a mirror surrounded by the electrode and adjusting means for the mirror operable from the external side of the plate. In the interior of the plate there is provided an annular cavity for circulating cooling fluid, and a channel which may be connected to a gas supply.

---

Figure 1:
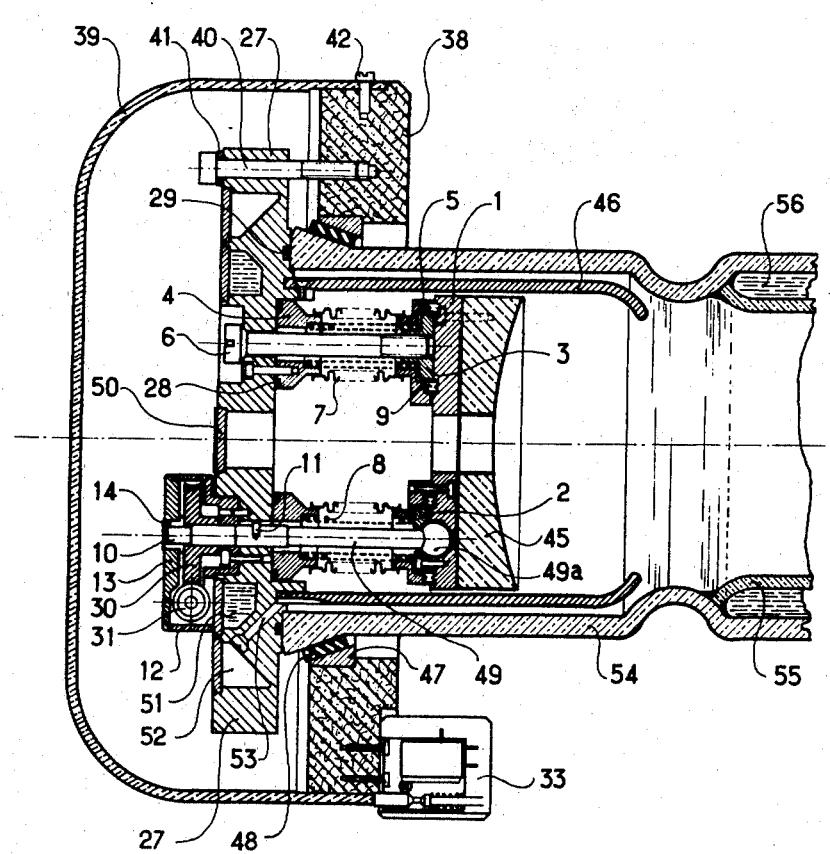

The present invention relates in general to gas lasers and more particularly to heads for laser tubes of the gaseous flux molecular type.

It is particularly the aim of the present invention to provide a head for a gaseous flux laser comprising, in mechanical inter-relation and in an especially space saving arrangement, the optical elements forming an optical cavity in which the process of stimulated emission of a wave of coherent radiation takes place, the electrical elements by which it is possible to apply to the gas the electric energization necessary for the population inversion of the energy levels of the atoms or molecules of the gas, and an introduction and withdrawal means for the circulation of the said gas.

Gaseous flux molecular lasers tend to reach very high power levels, and are provided of considerable length and diameter in relation to the length and diameter of standard gas lasers. In known gaseous flux lasers the electrodes may be arranged in small, laterally connected tubes, and gas circulation also takes place through small detachable tubes. Because of the length of the connections, the constructions of this type bring about a considerable reduction in the effective length available for the propagation of coherent waves in a gaseous medium energized in the tube, and this reduction can amount to as much as 0.70 m. over the length of the tube.

It is known to provide a concave mirror at the end of a laser tube by means of an optical polishing operation; however, an operation of this type can, in practice, be carried out only on a tube which is several decimeters long. Gaseous flux laser tubes, on the other hand, are of high power and generally have a length of several meters.

It is further known to fix the mirror formed on a disc of monocrystalline silicon by means of a silicon-glass weld. The largest diameter of a disc of this type in practice does not exceed 40 mm.; whereas, gaseous flux laser tubes of high power can generally have a diameter of as much as 50 mm.

The two methods of construction described above cannot be applied in the case of gaseous flux lasers to any great success for another reason of no less importance. The levels of power reached by gaseous flux molecular lasers are such that the mirrors do not last for any substantial length of time (two or three weeks at most) and it is essential frequently to restore the gold coating thereto, which means that it is necessary to provide a construction which is capable of ready and simplified dismantling and reassembly.

Compared with the known constructions, the laser arrangement in accordance with the present invention provides a means for constructing a laser head of integrated type which can be mounted on a tube of substantially any dimension. The laser head in accordance with the invention has a compact, integrated shape, with all of the elements concerned with the gaseous volume being assembled in a mechanical unit which is of reasonable length, for instance, approximately 15 centimeters, one such unit being arranged at each end of the tube, the said mechanical units forming with the said tube a structure of generally cylindrical shape.

It is a principal object of the present invention to provide a gaseous flux molecular laser which substantially, if not altogether, eliminates the difficulties and disadvantages inherent in known arrangements of a similar type.

It is another object of the present invention to provide a gaseous flux molecular laser which is of extremely simplified and compact configuration.

It is a further object of the present invention to provide a gaseous flux molecular laser having a laser head of integrated type which can be mounted on a tube of substantially any dimension.

It is still a further object of the present invention to provide a gaseous flux laser head having a thick metallic plate fixed to one end of the tube by clamping on a flange surrounding the end of the tube, the plate carrying an electrode in the form of a hollow cylinder, and a mirror being arranged in the interior of said electrode.

It is still another object of the present invention to provide a gaseous flux laser having a plate which carries, on the outside, elements for regulating the position of the mirror.

It is still a further object of the present invention to provide a gaseous flux laser having a plate which contains an internal cavity which can be connected to a cooling circuit.

It is another object of the present invention to provide a gaseous flux laser having a plate which contains a channel for the circulation of gas.

Figure 2:
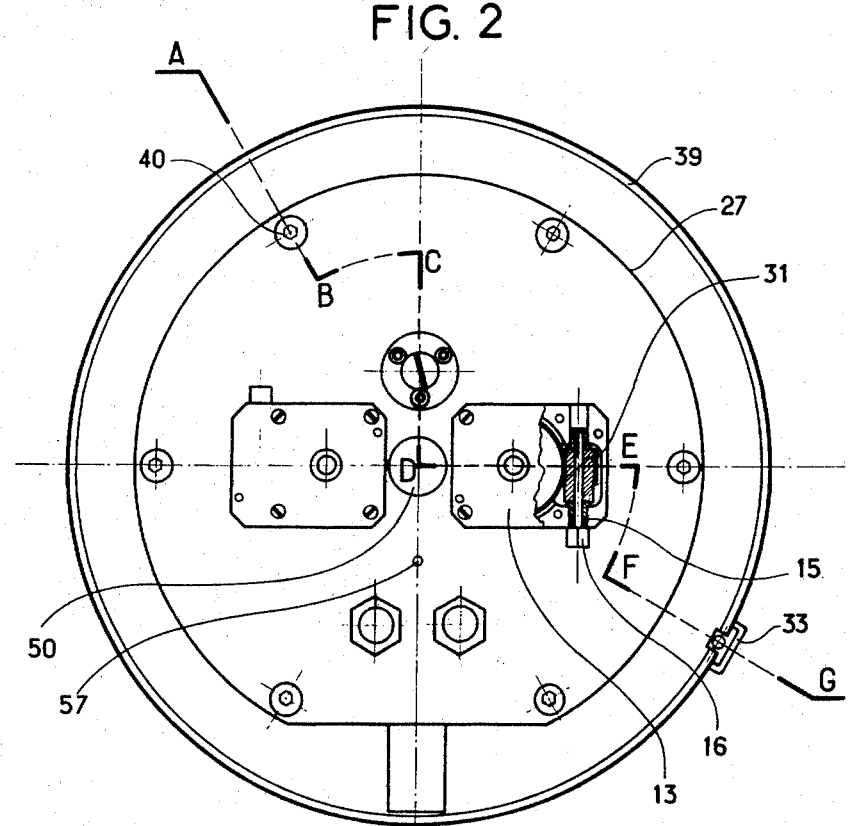

These and other objects, features and advantages of the present invention will become more apparent from the following detailed description of the present invention, when taken in conjunction with the accompanying drawings, which illustrate one exemplary embodiment of the present invention, and wherein:

FIGURE 1 is a sectional view of the laser head in accordance with the present invention taken through the line A, B, C, D, E, F, G, indicated on FIGURE 2;

FIGURE 2 as an end elevation of the present invention; and

Figure 3:
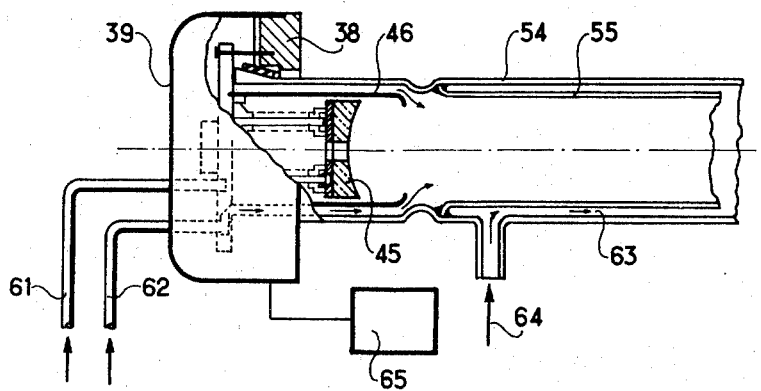

FIGURE 3 is a view of a portion of a laser tube equipped with the laser head in accordance with the present invention.

Looking now to FIGURES 1 and 2, a laser tube provided with the laser head in accordance with the present invention includes an outer glass tubular envelope 54 having an inner wall 55 which forms with the wall 54 a jacket for the circulation of cooling fluid. A base plate 27 abuts the end of the tubular envelope 54 and is sealed thereto by appropriate seals 29 through pressure exerted by appropriate securing members consisting of screws 40 and washers 41 secured to a clamping flange 38. The clamping flange 38 is mounted about the tubular end portion of the envelope 54 which is flared outwardly at the extreme end so that outward axial movement of the clamping flange is prevented by means of a rubber sheath 48 and a clamping cone 47.

In accordance with the present invention a concave mirror 45 is supported within the end of the cylindrical envelope 54 on the base plate 27 for adjustment with respect to the axis of the laser tube. The mirror 45 is secured to a support 1 by suitable fastening means. The upper portion of the support 1 is mounted to the base plate 27 by means of a screw 6 which engages with a suitable cylindrical part 3 mounted on the support 1. A sealing ring 5 is provided about the cylindrical part 3 providing a joint 9 with the support 1 and a sealing ring 4 is provided about the screw 6 at the base plate 27 and includes a toroidal joint 28 which forms a seal with the base plate. The sealing ring 4 is secured to the base plate 27 by suitable fastening means. The sealing rings 4 and 5 are interconnected by a bellows 7 and by suitable spring members 8 which tend to maintain the support 1, and consequently mirror 45, at a distance from the base plate 27, as determined by the screw 6.

The lower portion of the support member 1 is secured to the base plate 27 by a pair of regulating shafts 49 (only one being shown in FIGURE 1) which shafts 49 are provided with a spherical head 49a pivotably engaging within a suitable recess in the support member 1. The spherical head 49a is maintained within the recess by a retaining washer 2 suitably secured to the support member 1, and about which is provided a suitable sealing ring, similar to the sealing ring 5 provided in combination with the screw 6. A sealing ring 4 is also provided about the regulating shaft 49 adjacent the base plate 27 including a toroidal joint which provides for a lead through seal for the regulating shaft 49. The sealing rings are interconnected by a bellows and a spring arrangement similar to that provided in combination with the screw 6.

The regulating shaft 49 is provided with a slot within which a pin 11 rides so as to prevent rotation of the shaft. The outer end of the shaft 49 is provided in threaded engagement with a worm wheel 30 driven by a worm gear 31 all mounted within a gear case 12 and closed by a cover member 13. Thus, manipulation of the worm gear 31 results in a rotation of the worm wheel 30, which is in threaded engagement with the regulating shaft 49. However, since the shaft 49 is prevented from rotating due to the pin 11, the rotation of the worm wheel 30 will effect an axial displacement of the shaft resulting in a pivoting or tilting of the mirror 45 in accordance with the displacement of the spherical head 49a in the axial direction of the laser tube. In this way, a simple manipulation of a gear arrangement provides for adjustment of the position of the mirror 45.

A safety switch 33 is mounted on the clamping flange 38, and has one terminal connected to an electric generator 65 (FIGURE 3) and another terminal having a flexible connection which can be plugged into a sleeve 57, thus putting the unit of the head under voltage, but only when an insulating cover 39 is in place, thus forming an interlock between the cover 39, which is secured on the clamping flange about the end of the laser tube, and the electrical power source for the tube.

The regulation of the regulating shafts 49 may be effected separately or simultaneously by the worm gear 31. A separate manipulation of each of the two regulating shafts 49 provides for a more flexible control of the positioning of the mirror 45, and for this reason is obviously preferred. Thus, as illustrated in FIGURE 2, a separate gear control is provided fo reach of the regulating shafts 49.

A channel 51 connected to a water circuit 61 (FIGURE 3) insures the dissipation of heat developed in the electrode 46, secured to the base plate 27, during operation of the laser tube. This effect is complemented by the action of the gas which passes over the external part of the electrode 46 after being introduced through the channel 52 and the conduit 53 in the base plate 27.

As can be seen in FIGURE 3, a head in accordance with the present invention is provided at one end of a laser tube, which head is connected by means of a single connection to one terminal of the electric generator 65. The head is also connected by means of a connecting pipe 61 to a supply for cooling water, and by means of a connecting pipe 62 to a supply of gas for the laser. The tube has at the periphery a cooling jacket 63 connected at 64 to a supply of cooling water. Of the two heads forming the laser tube, one carries a mirror having a transparent window as illustrated, and the other carries a solid mirror.

We claim:

1. A head for a gaseous flux laser having an envelope and a pair of end mirrors, comprising
   a metallic plate for support of one of said mirrors,
   an electrode in the shape of a hollow cylinder mounted on said metallic plate, and
   adjustable support means for supporting said one mirror on said metallic plate within said electrode.

2. The combination defined in claim 1 wherein said adjustable support means includes control members mounted on the outside of said plate for adjusting the angle of said one mirror with respect to the axis of said envelope.

3. The combination defined in claim 3 wherein said adjustable support means includes a plurality of shafts extending between said one mirror and said plate, at least one of said shafts being axially movable.

4. The combination defined in claim 3 wherein said one shaft is provided at an end thereof with a universal coupling connecting said shaft to said mirror.

5. The combination defined in claim 3 wherein said control members include a gear arrangement for effecting axial movement of said one shaft.

6. The combination defined in claim 3 wherein said adjustable support means further includes a first sealing ring mounted on each of said shafts and secured to said one mirror by means of V-shaped metallic joints.

7. The combination defined in claim 6 wherein said adjustable support means further includes a second sealing ring mounted on each shaft and secured to said plate and a bellows extending between said first and second sealing rings.

8. The combination defined in claim 1 wherein said plate contains a first internal cavity for carrying cooling fluid.

9. The combination defined in claim 1 wherein said plate contains a second internal cavity which communicates with the interior of the envelope in the vicinity of the external surface of said electrode for supplying gas to the interior of said envelope.

10. The combination defined in claim 5 wherein said plate contains a first internal cavity for carrying cooling fluid and a second internal cavity which communicates with the interior of said envelope in the vicinity of the external surface of said electrode for supplying gas to the interior of said envelope.

References Cited

UNITED STATES PATENTS 3,359,812  12/1967  Everitt.

RONALD L. WIBERT, Primary Examiner

T. MAJOR, Assistant Examiner